Patented July 30, 1946

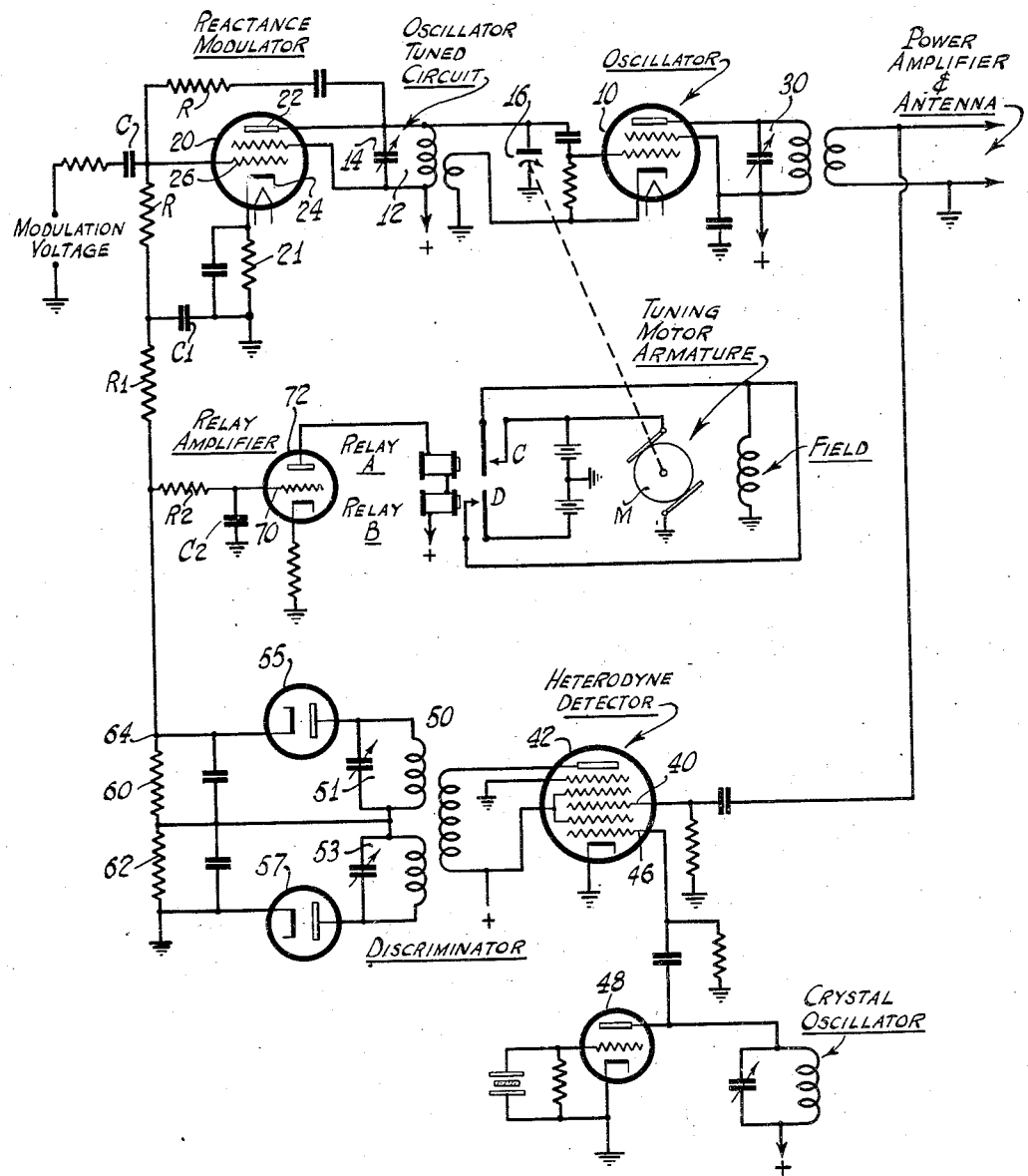

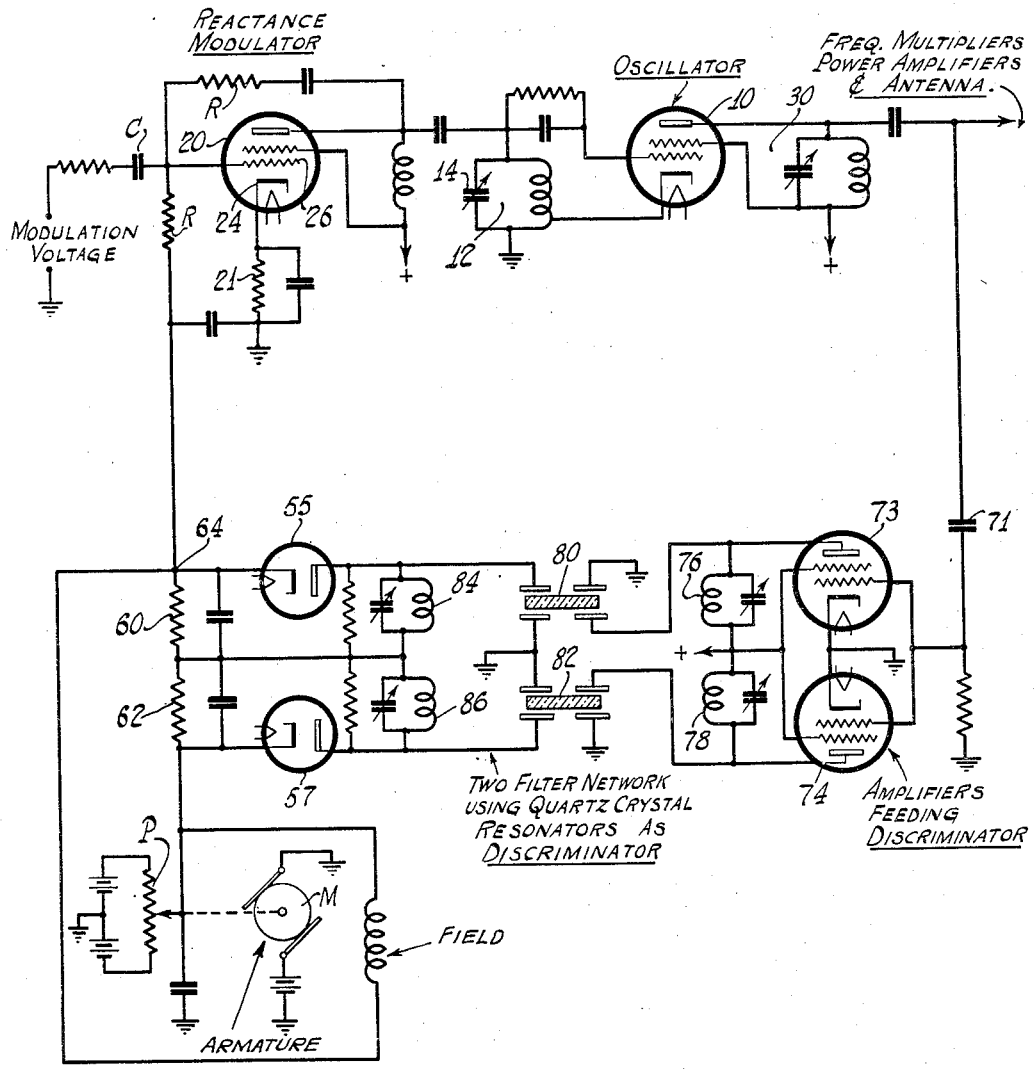

2,404,852

UNITED STATES PATENT OFFICE 2,404,852

AUTOMATIC FREQUENCY CONTROL

Winfield R. Koch, Haddonfield, N. J., assignor to Radio Corporation of America, a corporation of Delaware Application November 7, 1942, Serial No. 464,856

12 Claims. (Cl. 250—40)

This application discloses a new and improved means for controlling or stabilizing the frequency of operation of an oscillation generator, such as, for example, a frequency modulated oscillation generator for use in a transmitter or an oscillation generator for use in a receiver of the heterodyne type.

In my system, I utilize a motor driven frequency control element for the generator, in addition to an electrical control therefor, such as, for example, a reactance tube, to retune the generator in a compensating direction in the presence of prolonged or slow variations in the generator frequency and to also compensate and prevent faster variations of the oscillator frequency.

Moreover, by the use of my dual control means, sudden changes in the generator frequency when the automatic frequency control means fail are prevented because the motor control mechanism controlled by the output of the discriminator has automatically provided for the reactance tube a bias which returns the generator substantially to the proper frequency or has retuned the generator circuit by mechanical means; that is to say, the motor has acted through the reactance tube or more directly on the generator circuits to retune the same and when the output of the discriminator fails, the tuning is nearly right and remains at that point since the motor no longer works.

Tuning control systems making use of a motor driven condenser for stabilizing the frequency of a frequency modulated oscillator or an oscillator in a heterodyne receiver have been used in the prior art, so that if the control circuit fails, the frequency will not suddenly shift over a wide range.

Other control systems known in the art make use of a reactance tube connected with the oscillator and controlled by a bias derived from a discriminator acted on by the generated oscillations directly or after a change in frequency. In the latter systems, any slow drift in the generator frequency will cause a steady bias on the reactance tube to compensate the said drift and any failure of the control circuit including the discriminator circuit and tubes results in a sudden shift in frequency due to the loss of this steady bias on the reactance tube.

In my system I make use of two controls. One is a reactance tube control of the type wherein a discriminator circuit supplies to the reactance tube control electrode a potential of a polarity to compensate for fast drifts (below audible frequency) in the generated frequency. The other, or auxiliary control, consists of a motor drive for a tuning reactance in the oscillation generator circuit with the motor rotation and direction of rotation controlled by the discriminator output. In the arrangement if an output from the discriminator occurs for any appreciable time, the motor operates to automatically adjust or return the generator to the frequency of operation, i. e., its normal mean or average frequency thus restoring the discriminator output to zero. Now failure of the discriminator or the amplifier or a tube therein cannot result in an abrupt shift in the reactance tube bias and the consequential change in the generator frequency.

In a modification the motor drives a contact on a potentiometer in the bias circuit for the reactance tube so that again prolonged outputs from the discriminator initiate correcting changes in the steady bias on the reactance tube to return the discriminator output to zero so that failure in the discriminator or control circuits do not cause a sudden change in the reactance tube bias and a corresponding change in the generated frequency.

In describing my invention in detail, reference will be made to the attached drawings, wherein Figure 1 shows my control system including the reactance tube controlled oscillator and a motor controlled by a relay in turn controlled by the output of the discriminator with the motor driving a condenser in the oscillator circuit.

In Figure 2 the motor controlled by the output of the discriminator operates a potentiometer to adjust the steady direct current bias on the reactance tube grid.

In Figure 1, 10 is an oscillator tube having its cathode, control grid and screen grid coupled in an oscillation generating circuit including a tank circuit 12 comprising, if desired, a fixed capacity 14 and a variable condenser 16. The reactance tube modulator 20 has its anode 22 and cathode 24 coupled in shunt to the tank circuit 12 with its control grid 26 connected with a phase shifting circuit including resistors R and the input capacity of the tube to derive a voltage substantially in phase quadrature with the voltage on the anode 22. The reactance tube 20 operates in a well known manner to provide in the tank circuit 12 a reactance effect which is variable with the tube conductance and the latter is varied by modulating potentials applied, as shown, to the grid 26.

The oscillations generated and modulated in the tubes 10 and 20 appear in the output circuit 30 from where they are supplied to any utilization means.

The modulated oscillations are also supplied to the injector grid 40 of a mixer tube 42, the control grid 46 of which is also supplied by oscillations of constant frequency from a crystal controlled oscillator including tube 48. The oscillations from 48 are mixed with the modulated oscillations in 42 to impress on the descriminator 50 oscillations of intermediate frequency.

The discriminator 50 is of the Conrad type with off-tuned circuits 51 and 53. The operation thereof is believed well known in the art and will not be described in detail here. However, it will be noted that the output circuit of the descriminator diodes 55 and 57 comprises resistors 60 and 62 differentially connected so that the potential at the point 64 is zero when the intermediate frequency (I-F) fed to the discriminator 50 lies intermediate the frequencies to which 51 and 53 are tuned. The potential at 64 is also about zero when the control circuits fail, and no I-F appears in discriminator 50. The adjustment is made such that when this output of 64 is zero, the oscillation generator at 10 is operating at the desired mean or average or carrier frequency.

The potential at 64 is fed to the grid 26 of the reactance tube 20 to control the reactance provided by tube 20 in the tank circuit in a compensating direction as is well known in the art. The time constant of circuit C1—R1 is made such that potentials of modulation frequency or higher which might appear at 64 are filtered out and do not reach the grid 26. Potentials of lower frequency, however, are applied to the grid 26.

The potential at 64 is also supplied by way of a filtering or time constant circuit R2—C2 to the grid 70 of a relay amplifier tube 72 having relays A and B in its plate circuit. The relays A and B include normally open contacts C and D connected with the field winding of a motor M, the shaft of which is connected with condenser 16. When C is closed, the motor runs in one direction. When D is closed, the motor runs in the other direction. The amplifier 72 is adjusted to be sensitive to small prolonged changes in the potential at 64, and in the presence of such changes provides an output for the opposed windings of relays A and B sufficient to close the contacts C and D and keep one or the other thereof closed as long as the said bias appears at 64.

In Figure 1, I have shown the essential circuit elements of a practical arrangement including frequency conversion between the oscillator 10 and the control discriminator circuit 50. I believe the operations of the oscillator 10, the reactance modulator 20, the frequency converter 42, and the Conrad type discriminator 50 are obvious. Relays A and B are adjusted, so that with zero voltage at 64 provided by the discriminator, the contacts are open. If the discriminator output becomes slightly positive, contacts D of relay B close, causing the tuning motor to turn in such a direction as to restore the discriminator output to zero. A negative voltage output from the discriminator will close contacts C of relay A, causing the motor to turn in the opposite direction. It is well known that when a motor is used, the inertia of the armature prevents rapid changes in speed. The motor must be operated slowly or hunting will occur when the control is made very sensitive. Therefore, during the time that the motor is in operation, the discriminator output will not be zero, and a correcting voltage will be applied to the reactance modulator, which will give a more rapid correction to the oscillator frequency. This correction in the frequency will tend to bring the discriminator output to zero, but it cannot bring it completely to zero, because the correcting effect of the reactance modulator requires a voltage from the discriminator, and, because the relay responds to very small voltages from the discriminator, the motor control will, therefore, continue operation until it has brought the oscillator frequency to closer limits than the reactance tube could alone. This, of course, brings the potential at 64 nearer to zero. Now, if the crystal oscillator 48, for example, were to fail, the output of the discriminator would continue to be zero, or nearly so, and no sudden large change in the transmitted frequency would occur. If, however, the reactance tube alone had been doing the correcting, the change in discriminator output from the correcting voltage to zero would cause a sudden large change in the transmitted frequency.

The modification shown in Figure 2 utilizes in general the same principle as the modification shown in Figure 1. In Figure 2 the output from the oscillator 10 is fed by a coupling condenser 71 in phase to the control grids of a pair of amplifier tubes 73 and 74 having in their outputs tuned circuits 76 and 78. These circuits are coupled by crystal filter networks 80 and 82 and tuned circuits 84 and 86 to the diode rectifiers and provide the discriminating effect necessary to convert frequency drift or deviations on the generated wave to corresponding amplitude variations which are detected in the diode rectifiers.

The filter system uses the principle used in Figure 1 and in Conrad U. S. Patent No. 2,057,640, dated October 13, 1936. The circuits 76 and 84 are tuned to a frequency above the desired mean or carrier frequency. The circuits 78 and 86 are tuned to a frequency below the said desired mean frequency.

The crystal 80 is ground to resonance at a frequency above the desired average or mean frequency of the oscillations generated at 10, while the crystal 82 is ground to resonance at a frequency an equal amount below the mean or average frequency desired out of oscillator 10. Each crystal and its associated tuned circuits are chosen so as to form a narrow bandpass filter with a steep slope to the selectivity curve at the mean frequency. The selective system converts deviation in the mean generated frequency into corresponding amplitude changes in the carrier energy in a well known manner. Thus amplitude variations are detected in diodes 55 and 57 to provide a resultant potential at 64.

As in Figure 1 the resultant of the differential diode outputs which appears at 64 is fed to the grid 26 of the reactance tube for compensation purposes. The potential at 64 is also fed to the winding of a motor M, the shaft of which is connected to the movable point on the potentiometer P. The resistance of potentiometer P is connected across a source of potential, a point on which is grounded as is the cathode 24 of the reactance tube 20 by resistance 21, so that the potentiometer P or a portion thereof is included in the bias circuit for the grid 26 of the reactance tube.

The circuit in Figure 2 controls the frequency only through change in reactance tube bias. The improvement by the motor controlled potentiometer lies in the transfer of any continuous correcting voltage for the reactance tube from the discriminator output to the potentiometer circuit. Thus, a change in transmitted frequency, acting through the discriminator, would produce a correcting voltage on the grid of the reactance tube, tending to reduce the discriminator output to zero, but, of course, never reaching zero. The residual voltage, however, causes the motor field to be excited, and in such a direction as to supplement the correcting voltage from the discriminator. The inductance of the motor field and the inertia of the armature prevent rapid response by the motor. By making the motor control very sensitive, the output from the discriminator will finally come much closer to zero. Then in case of control circuit failure, such as burn-out of the heater in the discriminator diodes, the output from the discriminator will change very little in dropping to zero, and no large change in transmitted frequency will occur.

Various modifications of the circuit are, of course, possible, such as the use of separate modulator and frequency control tubes on the same oscillator tuned circuit. The armature winding of the motor M may be controlled by the relays, instead of the field winding. It should also be noted that balanced tubes in the circuit, such as, the diodes in the discriminator, or the amplifiers feeding the discriminator should either be contained in the same envelope, or be wired with the heaters in series so that failure of one would render the other inoperative at the same time, and thus avoid unbalance.

In describing my invention, I have referred to an oscillator in a wave length modulation system. It will be understood, however, that my control means may be used with any oscillator, as for example, one used for frequency conversion in a super-heterodyne receiver and other similar arrangements.

What is claimed is:

1. In means for tuning a tunable circuit, a source of wave energy the frequency of which may vary about a selected frequency, connections to said source for deriving a potential which varies above and below respectively a base value when the frequency of the wave energy varies above and below respectively a mean value, an electrically driven mechanical tuning means associated with said circuit for retuning the same in the presence of prolonged deviations of said potential from said base value, an electronic tuning means associated with said circuit for retuning the same in the presence of quick variations of said potential from said base value, and connections for controlling the mechanical tuning means and the electronic tuning means by said derived potential.

2. In apparatus for controlling the tuning of a tunable circuit, a source of wave energy the frequency of which may vary with respect to a selected frequency, connections responsive to variations in the frequency of said wave energy for producing a current of a certain base value when said wave energy is of said selected frequency and which changes about said base value when said wave energy frequency varies about said selected frequency, a reactance in said tunable circuit and a motor drive therefor for retuning said tunable circuit in the presence of variations in said produced current with a respect to said base value and supplemental means including an electron tube reactance in said tunable circuit for additionally tuning said tunable circuit when said produced current varies with respect to said base value.

3. In a wave length modulation system, an oscillation generator including a tank circuit, said tank circuit comprising two variable reactances, one of which is mechanically controlled and the other of which is electronically controlled, means coupled with said oscillator for deriving a potential which varies with variations in the mean frequency of the oscillations generated, a control means excited by said derived potential for adjusting the mechanically controlled reactance to compensate for slow prolonged changes in said mean frequency, and a control means excited by said derived potential for adjusting said electronically controlled reactance to compensate for rapid changes in the mean frequency of said generated oscillations.

4. In a signalling system, a tunable circuit including a variable tube reactance the reactive effect of which is determined by the potential on an electrode thereof, and a mechanically variable reactance, a source of wave energy the frequency of which may vary relative to a selected value, a frequency responsive circuit responsive to variations of the frequency of said wave energy for deriving a potential which varies with variations in the frequency of the wave energy from said selected value, a motor for driving said mechanically variable reactance, connections for controlling said motor by said derived potential for slowly adjusting the tuning of said mechanically variable reactance to tune said circuit in the presence of variations in the frequency of said wave energy from said selected value, and connections for applying said derived potential to said electrode of said tube for adjusting said tube reactance for rapid tuning of said circuit in the presence of variations in the frequency of said wave energy.

5. In a signalling system, a tunable circuit including a tube reactance the value of which is determined by the bias on an electrode thereon, a source of wave energy the frequency of which may vary with respect to a selected frequency, connections responsive to variations in the frequency of said wave energy for producing a potential of a certain base value when said wave energy is of said selected frequency and which changes about said base value when said wave energy frequency varies about said selected frequency, a potentiometer connected with said electrode in said tube, said potentiometer having a movable point for varying the bias on said electrode, a motor for driving said movable point, said motor having an actuating winding, and connections for applying said potential to said electrode and to said winding.

6. In an automatic tuning system, a tunable circuit, a source of wave energy the frequency of which may vary with respect to a selected frequency, a frequency variation detector excited by said wave energy for producing a current of a certain base value when said wave energy is of said selected frequency which current changes about said base value when said wave energy varies about said selected frequency, a reactance in said tunable circuit, a reversible motor for varying said reactance, a first control circuit actuated by prolonged changes of said current in either direction from said base value for operating said reversible motor in the proper direction for retuning said circuit and reestablishing said base value, and electronic means actuated by sudden changes of the value of said current in either direction from said base value for retuning said circuit and reestablishing said base value.

7. In a signalling system in combination, a tunable circuit, a source of wave energy the frequency of which is determined in part at least by the tuning of said circuit which frequency may vary with respect to a selected frequency, connections responsive to variations in the frequency of said wave energy for producing a current of a certain base value when said wave energy is of said selected frequency and of a value which changes about said base value when said wave energy varies about said selected frequency, electro-mechanical means actuated by prolonged changes of said current in either direction from said base value for slowly and nearly exactly retuning said circuit to reestablish said base value, and electronic means controlled by sudden changes of said current in either direction from said base value for rapidly retuning said circuit to assist in reestablishing said base value.

8. In a circuit tuning system in combination, a circuit having variable reactance, a source of wave energy the frequency of which is determined in part at least by the tuning of said circuit which frequency may vary about a selected value, connections for deriving a current which varies in accordance with variations in the frequency of wave energy, slow operating electro-mechanical control means actuated by variations in said derived current for varying the reactance of said circuit in a sense to stabilize said wave energy frequency at said selected value, and quick operating electronic control means actuated by variations in said derived current for varying the reactance of said circuit in a sense to assist in stabilizing said wave energy frequency at said selected value.

9. In a circuit tuning system, a tunable circuit wherein wave energy flows, the frequency of which is determined in part by the tuning of said circuit, a frequency responsive circuit coupled to said tunable circuit and responsive to changes in the mean frequency of said wave energy for producing a correspondingly varied potential, a relatively slow acting reversible tuning motor actuated by prolonged changes of said potential in either direction for retuning said circuit in a sense to oppose said changes in said mean frequency, and a relatively fast acting electronic tuner controlled by sudden changes in said potential for retuning said tunable circuit in a sense to oppose said changes in said mean frequency.

10. In apparatus for stabilizing the frequency of oscillatory energy appearing in a circuit, said oscillatory energy being of a frequency depending upon the tuning of said circuit, a tube reactance having output electrodes in shunt to a part at least of said circuit for controlling the tuning thereof, said tube reactance having a control electrode a potential on which determines the value of the tube reactance, a frequency discriminator and detector coupled by a frequency changer to said tuned circuit to be excited by oscillatory energy characteristic of the oscillation energy flowing in said tuned circuit, an impedance connected with the output of said detector wherein a potential is developed of a value depending upon the response of said discriminator circuit to the oscillatory energy exciting said discriminator, a coupling between said impedance and the control electrode of said tube reactance, a variable reactance in shunt to a part at least of said first mentioned circuit, a motor including a rotor, connected to said variable reactance, and a field winding, an excitation circuit for said field winding, said excitation circuit including a potential source and contacts arranged when closed to supply current of different polarity to said field winding, relays having armatures associated with said contacts, said relays having armature actuating windings, and an amplifier stage having input electrodes coupled to said first named impedance and having output electrodes coupled to said relay windings.

11. In apparatus for stabilizing the frequency of oscillatory energy appearing in a circuit, said oscillatory energy being of a frequency depending upon the tuning of said circuit, a tube reactance in shunt to a part at least of said circuit for controlling the tuning thereof, said tube reactance having a control electrode a potential on which determines the value of the tube reactance, a frequency discriminator and detector coupled to said tuned circuit to be excited by oscillatory energy flowing therein, an impedance connected with the output of said detector wherein a potential is developed of a value depending upon the response of said discriminator circuit to said oscillatory energy, a coupling between said impedance and the control electrode of said tube reactance, a variable reactance in shunt to a part at least of said first mentioned circuit, a motor including a rotor, connected to said variable reactance, and a field winding, an excitation circuit for said field winding, said excitation circuit including contacts arranged to supply current of different polarity to said winding, relays associated with said contacts, and an amplifier stage having input electrodes coupled to said first named impedance and having output electrodes coupled to said relays.

12. In a signalling system, a tunable circuit wherein oscillatory energy of a frequency depending upon the tuning of the circuit appears, a tube reactance in shunt to a part at least of said circuit for controlling the tuning thereof, said tube reactance having a control electrode the potential on which determines the value of the tube reactance, a biasing circuit for said electrode comprising impedance including a potentiometer with a movable point for varying the impedance in the biasing circuit, a frequency discriminator and detector coupled to said tuned circuit to be excited by oscillatory energy flowing therein, said detector having as an output load a part at least of said first mentioned impedance wherein a potential is developed of a value depending upon the response of said discriminator circuit to said oscillatory energy, a motor including a rotor connected to the movable point on said impedance, and a field winding for said motor coupled to said impedance, said field winding being excited by the potential developed therein by said detector to control the rotation of said motor.

WINFIELD R. KOCH.